United States Patent
Newman

(10) Patent No.: US 8,104,251 B2
(45) Date of Patent: *Jan. 31, 2012

(54) SYSTEMS AND METHODS FOR TRANSFERRING HYDRATED LENSES ON AN AUTOMATED LINE

(75) Inventor: Stephen D. Newman, Bayshore Park (SG)

(73) Assignee: Menicon Signapore Pte Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 12/618,449

(22) Filed: Nov. 13, 2009

(65) Prior Publication Data

US 2010/0170203 A1    Jul. 8, 2010

Related U.S. Application Data

(60) Continuation of application No. 11/923,878, filed on Oct. 25, 2007, now Pat. No. 7,637,085, which is a division of application No. 60/854,875, filed on Oct. 27, 2006.

(51) Int. Cl.
*B65B 3/04* (2006.01)
(52) U.S. Cl. ............... 53/473; 53/247; 53/471; 53/474; 206/5.1
(58) Field of Classification Search ............ 53/471, 53/473, 539, 239, 247, 249, 474; 206/5.1; 294/1.2, 64.1
See application file for complete search history.

(56) References Cited

U.S. PATENT DOCUMENTS

| 2,919,696 | A | * | 1/1960 | Rinaldy | 294/1.2 |
| 3,134,208 | A | * | 5/1964 | Richmond | 451/388 |
| 3,139,298 | A | * | 6/1964 | Grabiel | 294/1.2 |
| 4,026,591 | A | * | 5/1977 | Cleaveland | 294/1.2 |
| 5,169,196 | A | * | 12/1992 | Safabakhsh | 294/64.3 |
| 5,476,111 | A | | 12/1995 | Andersen et al. | |
| 5,524,419 | A | | 6/1996 | Shannon | |
| 5,558,374 | A | * | 9/1996 | Harrison | 294/1.2 |
| 5,561,970 | A | * | 10/1996 | Edie et al. | 53/473 |
| 5,706,634 | A | | 1/1998 | Edwards et al. | |
| 5,814,134 | A | | 9/1998 | Edwards et al. | |
| 6,494,021 | B1 | * | 12/2002 | Schlagel et al. | 53/432 |
| 6,502,876 | B1 | * | 1/2003 | Stockhorst et al. | 294/64.1 |
| 6,558,584 | B1 | * | 5/2003 | O'Neill et al. | 264/1.1 |

(Continued)

FOREIGN PATENT DOCUMENTS

| EP | 0653292 | 5/1995 |
| EP | 0741079 | 11/1996 |
| EP | 0765813 | 4/1997 |

OTHER PUBLICATIONS

U.S. Appl. No. 10/781,321, filed Feb. 17, 2004, applicant: Stephen D. Newman (104 pgs.).

*Primary Examiner* — Thanh Truong
(74) *Attorney, Agent, or Firm* — Holland & Hart LLP

(57) ABSTRACT

A method of transferring a contact lens from a first location to a primary package includes transferring the contact lens with an intermediate transfer member to the primary package, wherein the transfer member is sealed in the primary package with the contact lens. Additionally, according to another of many exemplary embodiments, a system for transferring a contact lens to a primary package includes a contact lens and a transfer member associated with the contact lens, wherein an automated lens transfer device is configured to couple the contact lens and the lens transfer member.

16 Claims, 4 Drawing Sheets

U.S. PATENT DOCUMENTS

| | | |
|---|---|---|
| 7,086,526 B2 | 8/2006 | Newman |
| 7,637,085 B2 * | 12/2009 | Newman .......................... 53/471 |
| 7,828,137 B2 | 11/2010 | Newman |
| 7,832,552 B2 | 11/2010 | Newman |
| 2005/0045589 A1 | 3/2005 | Rastogi et al. |
| 2008/0017525 A1 | 1/2008 | Newman |

* cited by examiner

SYSTEMS AND METHODS FOR TRANSFERRING HYDRATED LENSES ON AN AUTOMATED LINE

RELATED APPLICATIONS

The present application is a Continuation application of U.S. patent application Ser. No. 11/923,878, filed Oct. 25, 2007, entitled "System and Method for Transferring Hydrated Lenses on an Automated Line," which application claims priority under 35 U.S.C. §119(e) of previously-filed U.S. Provisional Patent Application No. 60/854,875, filed Oct. 27, 2006, entitled "System and Method for Transferring Hydrated Lenses on an Automated Line," which applications are hereby incorporated by reference in their entireties.

BACKGROUND

Traditionally, contact lens production processes include each lens being formed by sandwiching monomer or monomer mixture between a front curve (lower) mold section and back curve (upper) mold section. The monomer is polymerized, thus forming a lens which is then removed from the mold sections and either packaged dry or further treated in a hydration bath and packaged for consumer use.

Recent developments in the hydration and automated handling of wet contact lenses, as taught in U.S. Pat. No. 5,476,111, entitled "Automated Method and Apparatus for Hydrating Soft Contact Lenses" has enabled automatic robotic handling of lenses during hydration, and prior to the inspection thereof by the automated lens inspection system. Additionally, a number of automated systems have been designed to transport a hydrated lens from a lens hydration pallet or bath to the primary package in which it will be sterilized, stored, and delivered to a consuming patient. Traditionally, the automated lens transfer apparatus includes a number of transfer elements including suckers configured to create a lens retaining vacuum which is used to maintain the lens on the sucker during lens transfer to a primary package. Typically, a traditional primary package will include a preformed polypropylene member or boat that will receive and contain the contact lens and a specified quantity of packaging saline. During the traditional packaging process, the boat is charged with a measured quantity of saline to which is added the polymerized contact lens. Once the lens and saline are placed within the boat, the package is closed by heat sealing a laminated foil to the top of the package.

However, traditional systems and methods for transferring hydrated contact lenses to a primary package have suffered from a number of shortcomings. Specifically, transferring an at least partially hydrated lens from a lens hydration bath to a primary package often resulted in the lens inverting, slipping, sliding, or otherwise moving on the sucker apparatus. Consequently, the subsequent placement of the lens into the primary package is less than ideal. In particular, when the precise placement of the lens into the primary package is critical, traditional systems are not adequate. Consequently, traditional lens transfer is typically performed manually or with a dry lens.

An additional shortcoming of traditional lens transfer systems and methods is that once a lens is securely located on the sucker transfer apparatus, surface tension between the lens and the sucker transfer apparatus will assist in maintaining the lens on the transfer apparatus. However, successful removal of the lens from the sucker transfer apparatus has to completely overcome that surface tension. Consequently, traditional systems often eject a blast of air and/or fluid from the sucker transfer apparatus to remove the lens. Often, partial retention of the lens occurs due to the presence of surface tension between the lens and a portion of the sucker transfer apparatus. Alternatively, if sufficient air and/or fluid are forced upon the lens to remove the lens from the sucker transfer apparatus, there is a potential for damage to the lens.

SUMMARY

According to one exemplary embodiment, a method of transferring a contact lens to a primary package includes transferring both the lens and an intermediate transfer member from a first location to the primary package, wherein the intermediate transfer member is sealed in the primary package with the contact lens.

Additionally, according to another of many exemplary embodiments, a system for transferring a contact lens to a primary package includes a contact lens and an intermediate transfer member associated with the contact lens, wherein an automated lens transfer device is configured to couple the contact lens and the intermediate lens transfer device for placement.

BRIEF DESCRIPTION OF THE DRAWINGS

The accompanying drawings illustrate various embodiments of the present system and method and are a part of the specification. The illustrated embodiments are merely examples of the present system and method and do not limit the scope of the claims. The summary and other features and aspects of the present system and method will become further apparent upon reading the following detailed description and upon reference to the drawings in which

Throughout the drawings, identical reference numbers designate similar, but not necessarily identical, elements.

DETAILED DESCRIPTION

The present disclosure details methods and system for the transfer of at least partially hydrated contact lenses using an intermediate transfer member. More specifically, the present specification describes methods and systems for the use of an intermediate transfer member to transfer an at least partially hydrated contact lens from a hydration bath or any other location to a primary package, wherein the transfer member is disposed, along with the at least partially hydrated contact lens, into a primary package.

As used in the present specification and in the appended claims, the term "primary pack" shall be interpreted broadly as including any contact lens case or packaging that receives a previously unused contact lens. Particularly, as used herein, the term primary pack shall include any contact lens packaging used to house a previously unused contact lens prior to delivery to a user.

In the following specification, for purposes of explanation, numerous specific details are set forth in order to provide a thorough understanding of the present system and method for transferring an at least partially hydrated lens. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

As mentioned previously, the transfer of a contact lens directly with a sucker or other traditional type of transfer apparatus provides a number of adhesion difficulties. Particularly, when an at least partially hydrated lens is transferred from a lens hydration bath or another location to a primary package, the lens is often inverted, slips, slides, or otherwise moves on the sucker apparatus, thereby reducing the likelihood of a repeatable transfer method. Similarly, complete and consistent removal of an at least partially hydrated lens from a traditional type of transfer apparatus is difficult since the at least partially hydrated lens often remains adhered to the transfer apparatus due to surface tension. Additionally, there is a potential for damage of the contact lens due to contact between the transfer apparatus and the lens itself.

The present exemplary systems and methods incorporate an intermediate lens transfer member that eliminates contact between the lens transfer apparatus and the lens itself during transfer of the at least partially hydrated lens to a primary package. Consequently, problems associated with surface tension, contamination and potential damage to the lens by the lens transfer apparatus are eliminated. Additionally, according to various exemplary embodiments disclosed herein, the exemplary intermediate lens transfer member may be disposed, along with the at least partially hydrated lens, in the primary package.

Figure 1:
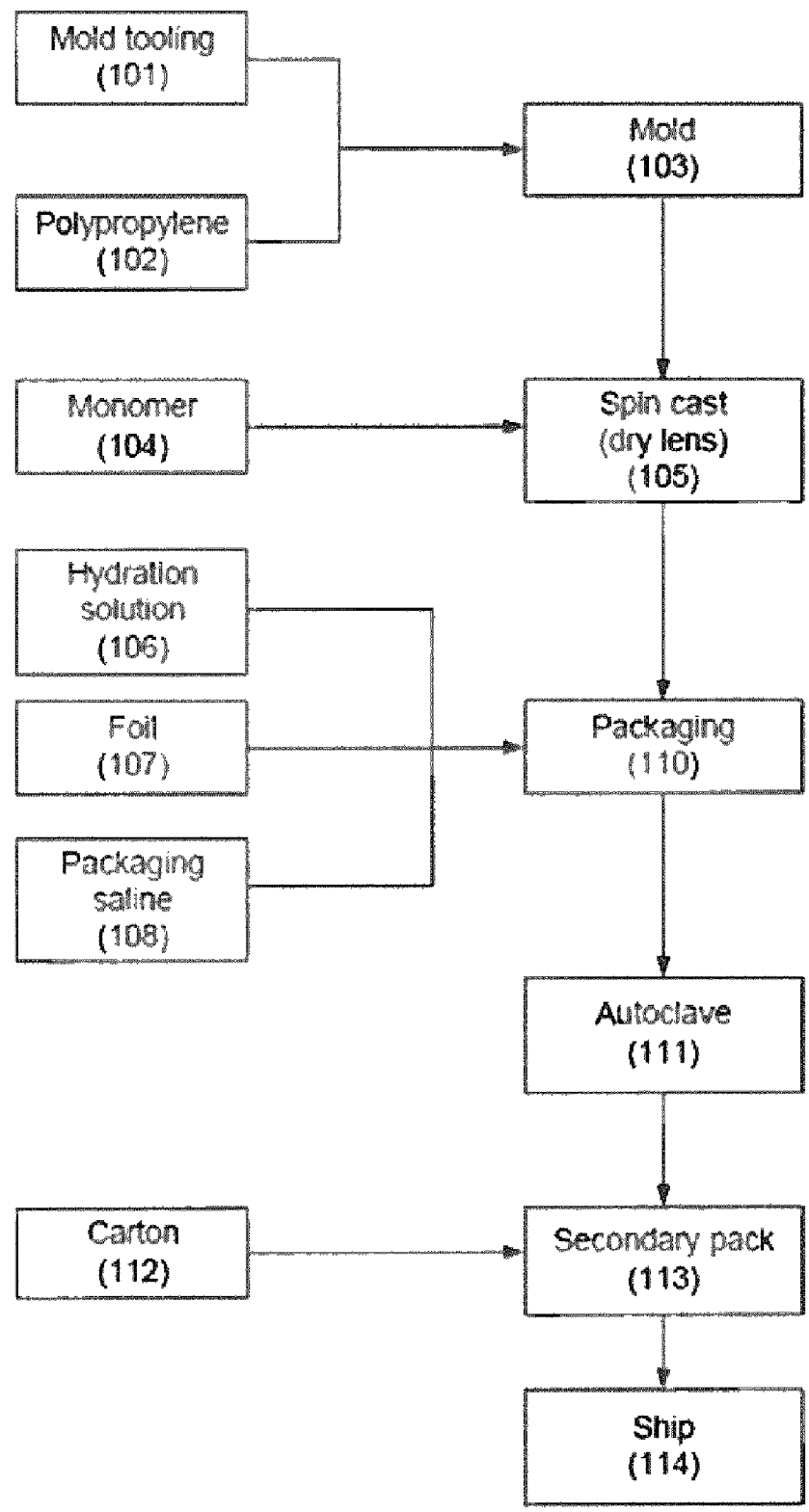
FIG. 1 illustrates a process of manufacturing contact lenses, according to one exemplary embodiment.

Referring now to FIG. 1, an exemplary manufacturing and sterilization process for contact lenses is illustrated. As shown in FIG. 1, the manufacturing and sterilization of a contact lens may include a mold (103) where the desired lens is produced. According to one exemplary embodiment, the mold (103) may be produced from any number of suitable thermoplastic polymers including, but in no way limited to, polypropylene, polyethylene terephthalate, or polystyrene (102) that may be shaped as needed through a mold tooling process (101).

A monomer mixture (104) may then be injected into the mold (103) to form a hydrophilic contact lens. While any number of known manufacturing methods may be used to form the desired lens, according to one exemplary embodiment, spin casting is used to form the monomer into the desired lens shape in the mold. The monomer mixture is then polymerized either thermally or photo-chemically, thereby forming a dry lens (105). The material used may include, but is in no way limited to, 2-hydroxyethyl methacrylate (HEMA) or copolymers of glycerol monomethacrylate and HEMA, or methacrylic acid and HEMA. The lens may also include a handling tint, for example, an anthroquinone dye or a copper phthalocyanine pigment. Following polymerization, the contact lens may be subjected to hydration and other processing steps, such as quality inspection.

Once formed, the lens may, according to one exemplary embodiment, be hydrated and packaged. According to one exemplary embodiment, the lens is first placed in a hydrating bath or hydration solution (106), where the typically brittle lens is hydrated to add pliability and reduce stresses within the material. Once hydrated, the lens is transferred to its initial packaging (110). As used herein and in the appended claims, "initial" or "primary packaging" refers to the packaging in which a contact lens is placed and in which it is transported to the patient or end user who then opens the initial packaging to access and wear the lens. Consequently, initial packaging is distinguished from any subsequent storage container that the lens may be placed in during the time it is used by the wearer for cleaning or storage.

As illustrated in FIG. 1, the packaging (110) may also include a quantity of hydration solution (106) that is used to maintain the hydration of the lens and is also used by the wearer to wet the lens when the initial packaging is opened and before the lens is applied to the eye. In addition to any such hydration solution, the lens is typically packaged in a quantity of saline solution (108), also referred to as packaging solution, to maintain the lens in a moist state prior to initial use. The saline solution (108) may also contain a suitable buffering agent such as phosphate, borate or bicarbonate and may also contain a very small amount of a surfactant, such as poloaxamer 407 or lauroamphoacetate, to prevent the lens from sticking to the packaging.

As described above, the lens and packaging saline are typically placed in a container referred to as boat. The boat is then sealed with a substrate such as a foil (107). According to one exemplary embodiment, the foil (107) includes a laminated aluminum foil configured to form a seal with the boat and prevent moisture loss from within the primary packaging.

According to the present exemplary method, the now packaged lenses would then be sterilized, such as by treatment in an autoclave (111). Once sterilized, the packaged lens may be combined into a carton (112) or other container referred to as a secondary package (113). The secondary package (113) contains a quantity of identical or related lenses, e.g., for right and left eyes. Once in the secondary packaging (113), the lenses are ready for shipping (114), for example, directly to the customer or wearer.

The entire process illustrated in FIG. 1 can be implemented as a flow-line process with the exception of the autoclaving (111). Obviously, a flow-line process is most efficient when operated in conjunction with automated devices.

Figure 2:
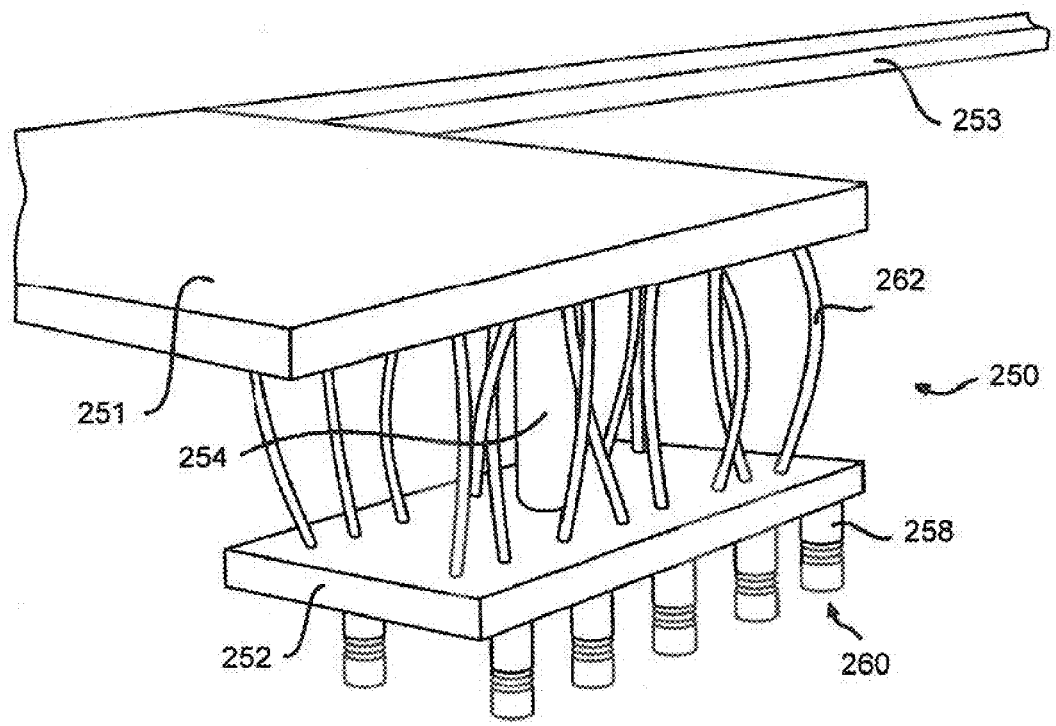
FIG. 2 illustrates a lens transfer apparatus, according to exemplary principles described herein.

FIG. 2 illustrates an exemplary automated device that may be used to transfer an at least partially hydrated lens from a location such as a hydration bath to a primary package. While any number of automated transfer devices and/or configurations may be used to transfer an at least partially hydrated lens, the present exemplary system and method will be described, for ease of explanation only, as being performed with a standard sucker or sucker array. According to the exemplary embodiment illustrated in FIG. 2, the automated transfer apparatus includes, but is in no way limited to, a support (252) which is mounted to the lower end of a rotating shaft (254). The upper end of the shaft (254) is coupled to a rotating means (not shown) which rotates the support through 90 degrees in the horizontal plane. Extending downwardly from the support (252) is an array of regularly spaced fingers (258), the tips of which (260) are hollow so that a vacuum may be drawn there through. This vacuum is used to securely hold the at least partially hydrated lens and a transport member during transport. The fingers (258), which are hollow so as to form a conduit through which the vacuum may be drawn, are coupled to tubes (262), at the support (252) for the purposes of supplying the vacuum pressure to the finger tips (260).

According to one exemplary embodiment, the rotating shaft (254) is coupled, through the rotating means, to a mounting platform (251). The mounting platform is, in turn, mounted to a dual axis motive means. Track (253) includes the horizontal axial component along which the mounting platform translates. During operation, the assembly is positioned above the lens hydration bath. Once the sensor elements have determined that an array of lenses has been at least partially hydrated, the manifold (252) and fingers (258) are lowered by the dual axis motive means in order to retrieve and translate the at least partially hydrated lenses.

Figure 3A:
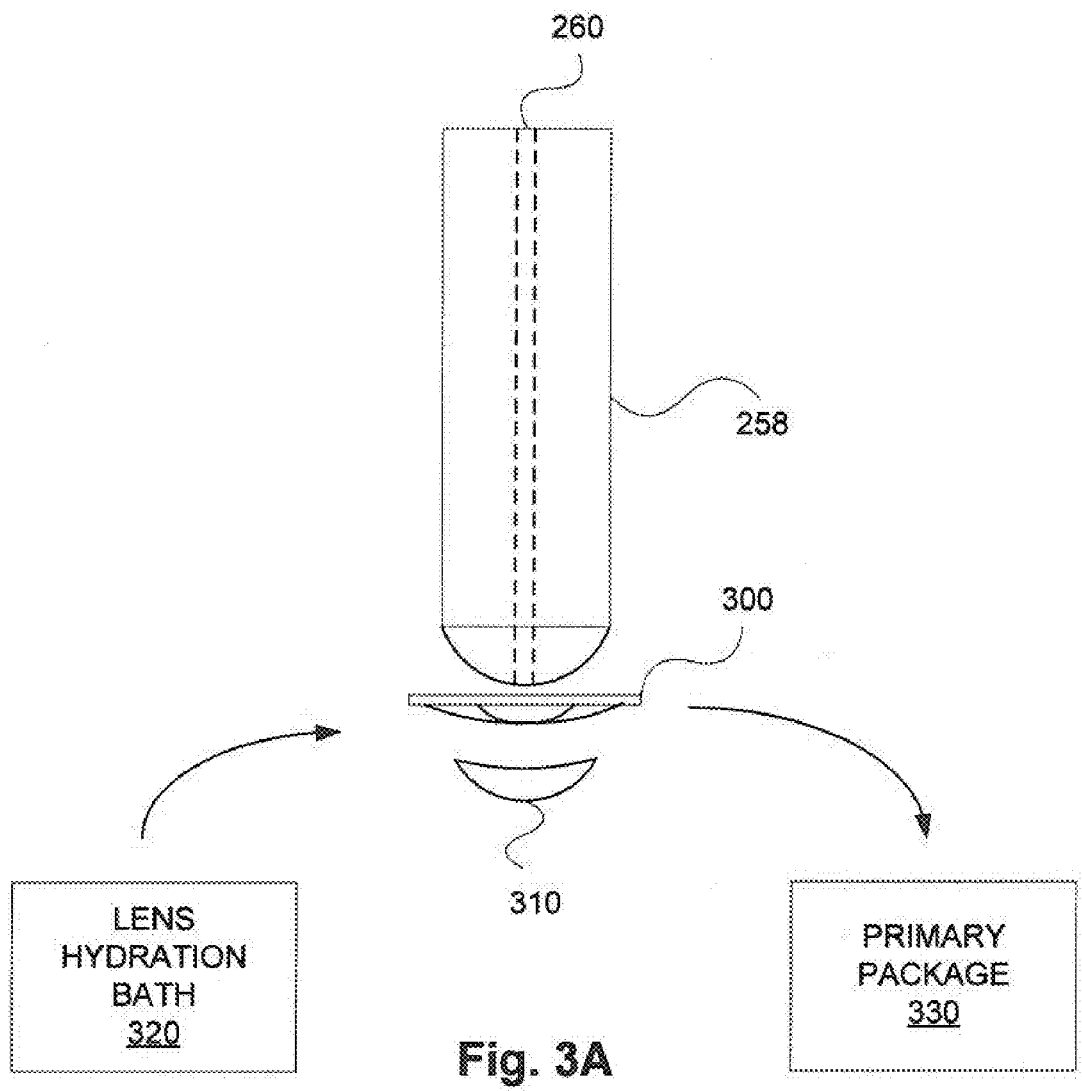
FIG. 3A illustrates a method for transferring both a contact lens and an intermediate transfer member to a primary package, according to one exemplary embodiment of the principles described herein.

According to one exemplary embodiment, the at least partially hydrated lenses are positioned with an intermediate lens transfer member (300; FIG. 3A) between the lens and the finger tips (260), as will be described in further detail below. The fingers (258) are lowered until the intermediate lens transfer member is contacted. A vacuum is drawn in the finger tips (260) once the intermediate lens transfer member is contacted in order that a secure grip on the lens and intermediate lens transfer member may be maintained. The manifold (252) and fingers (258) are then raised, rotated, and translated to a position above the desired primary package. The lens and the intermediate lens transfer member can then be placed within the primary package and sealed for further processing and shipping to the consumer.

According to the present exemplary system and method, the use of an intermediate lens transfer member eliminates contact between the transfer fingers (258) and the lens, thereby eliminating the above-mentioned issues present in traditional methods. Specifically, according to one exemplary embodiment illustrated in FIG. 3A, the adhesive properties of an at least partially hydrated lens, such as surface tension, are beneficial in that they help to secure the lens (310) to the intermediate transfer member (300) during transport from the lens hydration bath (320) to the primary package (330). As shown, the tip of the finger (258) including the hollow lumen (260) contact the intermediate transfer member (300) and secure the intermediate transfer member, and consequently the lens (310), thereby facilitating their transfer to the primary package (330). Once properly placed above the desired primary package (330), the vacuum created by the hollow lumen (260) is released and the intermediate transfer member (300) drops or is otherwise removed.

According to one exemplary embodiment, the present exemplary system and method eliminate a number of disadvantages of the prior art. Specifically, according to one exemplary embodiment, the present system and method avoid pinching the lens because the lens is never contacted directly by the fingers (258). Additionally, the lens is prevented from folding, by virtue of the shape of the intermediate transfer member. According to one exemplary embodiment, the intermediate transfer member is a convex shaped disc. Moreover, positioning of the lens is controlled by positioning the intermediate transfer member (300). Consequently, the lens (310) and the intermediate transfer member (300) may be positioned without dealing with the surface tension and other issues associated with a hydrated lens. This exemplary method eliminates many of the situations likely to cause damage to the lens or likely to move the lens into an unfavorable position or loosing the lens, as are currently present in traditional lens transfer systems and methods.

FIG. 3A illustrates an exemplary transfer finger (258) having a convex head, according to one exemplary embodiment. While an exemplary head shape of the transfer finger (258) is illustrated in FIG. 3A, any number of head shapes configured to couple the intermediate transfer member (300) may be used. Additionally, while a vacuum coupling system is described herein for ease of explanation only, any number of coupling means may be used to couple and de-couple the intermediate transfer member to the exemplary transfer finger (258) including, but in no way limited to, mechanical attachment systems, ejector pins, mating features, and the like.

Figure 3B:
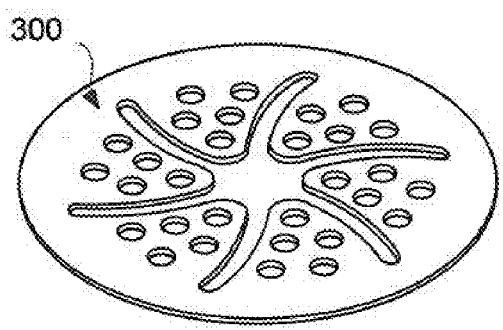
FIG. 3B is a perspective view of an exemplary intermediate transfer member, according to one exemplary embodiment.

FIG. 3B illustrates an exemplary intermediate transfer member (300), according to one exemplary embodiment. As mentioned, the exemplary intermediate transfer member (300) may assume any number of shapes and structures including, but in no way limited to, a polypropylene disc, foam such as polyvinyl alcohol (PVA) foam, a foil, and the like. FIG. 3B illustrates an exemplary intermediate transfer member (300) in the form of a convex polypropylene disc that may also be used as a spring disc structure. As illustrated in FIG. 3B, the exemplary intermediate transfer member may include any number of features such as orifices, protrusions, lobes, and the like. As mentioned, the exemplary intermediate transfer member (300) may provide additional functionality to the resulting primary package including, but in no way limited to, shape restoration, position maintenance, hydration, solution storage, and the like.

In addition to assuming any number of shapes or comprising different materials, the exemplary intermediate transfer member (300) may also include any number of features or receive any number of treatments to facilitate the simultaneous transfer of the intermediate transfer member (300) and an at least partially hydrated lens. According to one exemplary embodiment, the intermediate transfer member (300) may include protrusions, recesses, or any other feature that may facilitate coupling of the exemplary transfer finger (258; FIG. 3A) to the transfer member. Additionally, according to one exemplary embodiment, the surface of the intermediate transfer member (300) may receive a surface treatment in order to increase the surface energy of the transfer member. According to one exemplary embodiment, an increase in the surface energy of the intermediate transfer member (300) will facilitate or enhance the functional adhesion of an at least partially hydrated lens to the surface thereof. Any number of surface treatments may be performed on the intermediate transfer member (300) including, but in no way limited to, corona discharge, flame treatment, plasma treatment, or any other similar known surface treatment.

Further, while FIG. 3B illustrates an exemplary intermediate transfer member (300) as a disc having a convex shape, any number of intermediate transfer members may be incorporated by the present exemplary system and method including, but in no way limited to, a polypropylene disc, a foam including a polyvinyl alcohol (PVA) foam, a foil, and the like. Additionally, the intermediate transfer member may assume any number of shapes and/or sizes including, but in no way limited to, a flat disc, a curved disc, a lobed member, a sphere, a hemisphere, a nippled member, or any number of symmetrical or irregular shapes having flat and/or arcuate surfaces. Further details of polypropylene discs and/or foam substrates may be found in U.S. Pat. No. 7,086,526, U.S. patent application Ser. Nos. 10/781,321; 60/832,324; and Ser. No. 11/404,200, which references are incorporated herein by reference in their entireties.

As mentioned above, the present exemplary intermediate transfer member (300) is, according to one exemplary embodiment, finally disposed in the primary package (330) and is either sealed within the primary package with the contact lens (310) or alternatively, is coupled to the primary package with a surface of the intermediate transfer member on the internal portion of the primary package. FIGS. 4A through 4D illustrate exemplary primary packages (330) receiving an at least partially hydrated lens (310) and an intermediate transfer member (300), according to various exemplary embodiments.

Figure 4A:
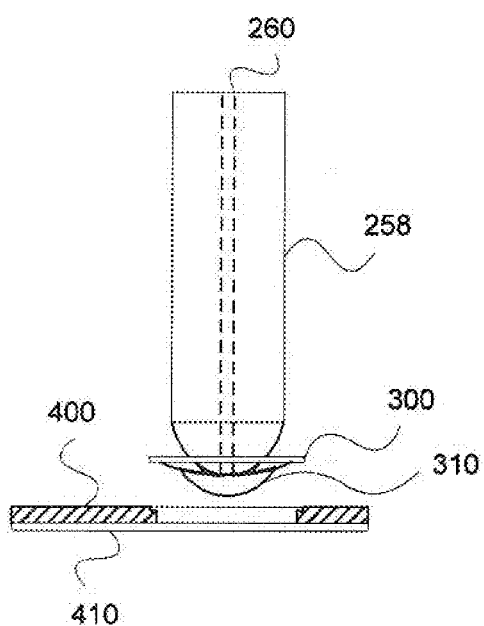
FIGS. 4A through 4D illustrate the insertion of a contact lens and an intermediate transfer member to various primary packages, according to various exemplary embodiments.

FIG. 4A illustrates a lens (310) and an intermediate transfer member (300) being placed in the back of a substrate member (400) that is peelingly sealed on an opposing side by a foil (410). As shown, placement of the intermediate transfer member (300) within the orifice defined by the substrate (400) will likely compress the lens (310). According to the illustrated exemplary embodiment, placement of the intermediate transfer member (300) is critical to preventing pinching or other damage of the lens (310) as it is compressed into the relatively shallow orifice. Consequently, the present exemplary system and method are ideal for the present assembly. Further details of the substrate primary package illustrated in FIG. 4A are provided in U.S. Patent Application No. 60/832,324 titled "Duo Packaging for Disposable Soft Contact Lenses Using a Substrate," which reference is incorporated herein by reference in its entirety. Once the exemplary lens (310) and the intermediate transfer member (300) are placed within the orifice defined by the substrate member (400), another foil or other barrier layer may then be permanently sealed to the rear portion of the substrate, thereby sealing the exemplary lens (310) and transfer member (300) within the defined orifice. Subsequently, access to contact lens (310) by the lens wearer is achieved by peeling back foil (410).

Figure 4B:
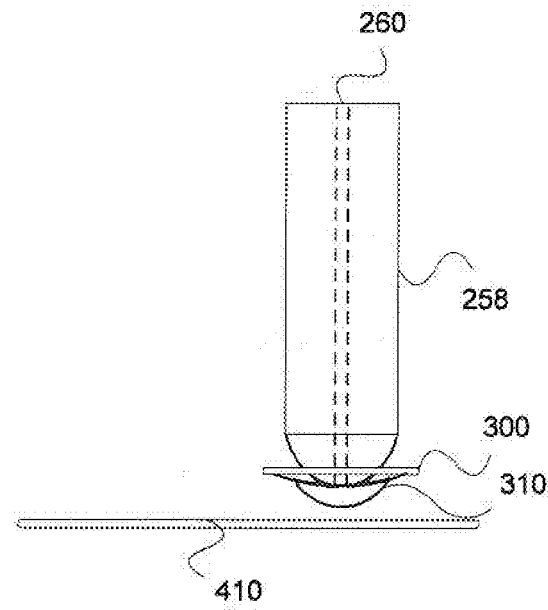

Turning now to FIG. 4B, the intermediate transfer member (300) and the contact lens (310) may both be placed in a sachet type primary package made of a foil substrate (410). As illustrated in FIG. 4B, the lens (310) and the intermediate transfer member (300) may both be disposed on the foil (410) and another foil (not shown) may then be placed over the lens and transfer member, where they are sealed and prepared for sterilization. Alternatively, the single foil (410) may be doubled back upon itself and sealed along the edges to create the sachet type primary package. Further details of the exemplary primary package and sealing method illustrated in FIG. 4B can be found in U.S. Pat. No. 7,086,526, U.S. patent application Ser. Nos. 10/781,321 and 11/404,200, which references are incorporated herein by reference in their entireties.

Figure 4C:
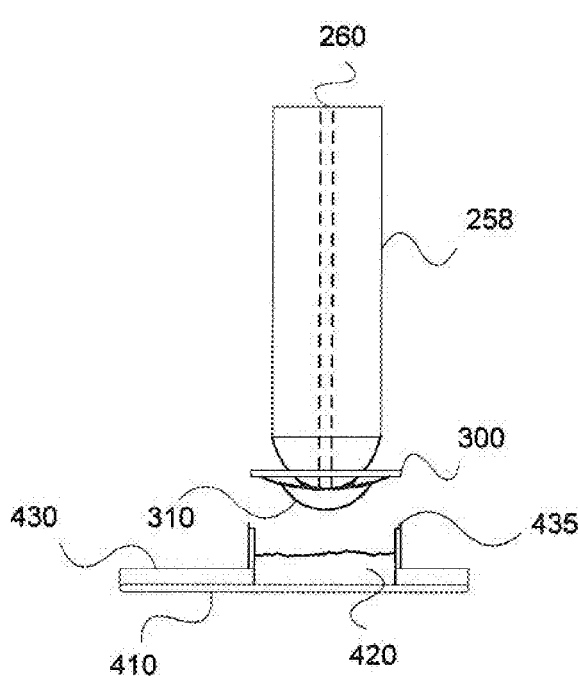

Further, as illustrated in FIG. 4C, the present exemplary systems and methods may be used to place an intermediate transfer member (300) and a contact lens (310) into a primary package that does not compress the lens. Rather, as illustrated in the exemplary embodiment of FIG. 4C, the intermediate transfer member (300) may form a top or bottom of a boat (430) containing solution (420) and including a foil opening system, as is known in the prior art. Specifically, as shown, a traditional boat may be formed with the bottom surface removed, thereby leaving a protruding wall (435). As shown, the intermediate transfer member (300) and the contact lens may then be placed within the protruding wall (435), causing the intermediate transfer member to be coupled to the protruding wall (435). In this exemplary embodiment, the intermediate transfer member (300) may then be securely coupled to the protruding wall (435) forming the bottom surface of the boat. Once inverted, the solution (420) will then hydrate the lens (310). Alternatively, a lens (310) may be transferred with an intermediate transfer member (300) that forms the top sealing member of the boat, such as a polymer or foil substrate.

Figure 4D:
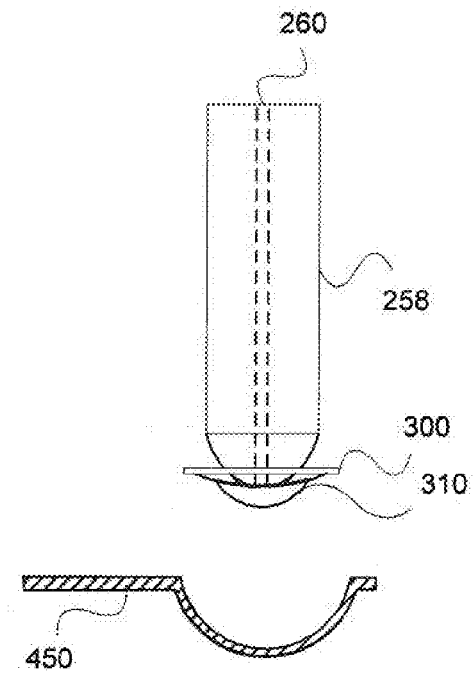

Additionally, as illustrated in FIG. 4D, the intermediate transfer member (300) and a lens (310) may be disposed in a traditional boat (450) followed by a traditional sealing member (not shown). Specifically, in contrast to the embodiment illustrated in FIG. 4C, the transfer member (300) illustrated in FIG. 4D does not form the bottom or top of the boat (450). Rather, the intermediate transfer member (300) and lens (310) can be inserted into the boat (450) in a desired orientation, followed by the placement of a barrier layer such as a foil substrate. The substrate may then be sealed to the boat (450), hermetically sealing the transfer member and the lens (310).

In conclusion, the present exemplary manufacturing system and method incorporate an intermediate lens transfer member that eliminates contact between the lens transfer apparatus and the lens itself. Consequently, problems associated with surface tension, contamination and potential damage to the lens by the lens transfer apparatus are eliminated.

The preceding description has been presented only to illustrate and describe embodiments of the exemplary systems and methods. It is not intended to be exhaustive or to limit the systems and methods to any precise form disclosed. Many modifications and variations are possible in light of the above teaching.

What is claimed is:

1. A method of transferring a contact lens to a primary package, comprising:
   presenting a lens transfer apparatus;
   providing an intermediate transfer member;
   engaging said contact lens with said intermediate transfer member; and
   transferring said lens and said intermediate transfer member to said primary package with said lens transfer apparatus, wherein said intermediate transfer member is disposed between said lens transfer apparatus and said contact lens during said transfer;
   wherein said intermediate transfer member is sealed in said primary package with said contact lens.

2. The method of claim 1, wherein said intermediate transfer member is removably coupled to said lens transfer apparatus during said transferring of said lens.

3. The method of claim 1, wherein said intermediate transfer member comprises a foil.

4. The method of claim 1, wherein said intermediate transfer member comprises a disc.

5. The method of claim 1, wherein said intermediate transfer member comprises a foam.

6. The method of claim 1, wherein said intermediate transfer member comprises an arcuate surface.

7. The method of claim 1, wherein transferring said contact lens with an intermediate transfer member comprises:
   coupling said contact lens to said intermediate transfer member;
   coupling said intermediate transfer member to said lens transfer apparatus;
   translating said lens transfer apparatus to said primary package; and
   dispensing said contact lens and said intermediate transfer member into said primary package.

8. The method of claim 7, wherein said contact lens is coupled to said intermediate transfer member by a surface tension.

9. The method of claim 7, wherein said intermediate transfer member is coupled to said lens transfer apparatus by one of a vacuum or a mechanical interference.

10. The method of claim 1, wherein said intermediate transfer member comprises a bottom of a primary package.

11. The method of claim 1, wherein said intermediate transfer member comprises a top of a primary package.

12. The method of claim 1, wherein said transferring said contact lens with an intermediate transfer member to said primary package comprises:
   providing a substrate member defining an orifice, wherein said substrate member includes a front surface and a first barrier member peelably sealed to said front surface;
   disposing said contact lens and said intermediate transfer member into said orifice from a back side of said substrate member; and coupling a second barrier member to said backside of said substrate member hermetically sealing said contact lens and said intermediate transfer member in said orifice.

13. The method of claim 12, wherein said coupling a second barrier member to said backside of said substrate member compresses said contact lens and said intermediate transfer member in said orifice.

14. The method of claim 1, further comprising treating a surface of said intermediate transfer member to increase a surface energy of said intermediate transfer member.

15. The method of claim 14, wherein said step of treating a surface of said intermediate transfer member comprises treating said surface of said intermediate transfer member with one of a corona discharge treatment, a flame treatment, or a plasma treatment.

16. A method of transferring a contact lens to a primary package, comprising:
  presenting a lens transfer apparatus;
  providing an intermediate transfer member;
  engaging said contact lens with said intermediate transfer member; and
  transferring said lens and said intermediate transfer member to said primary package with said lens transfer apparatus, wherein said intermediate transfer member is disposed between said lens transfer apparatus and said contact lens during said transfer;
  wherein said intermediate transfer member is released from said lens transfer apparatus and deposited into said primary package with said contact lens.

* * * * *